US011137802B2

(12) United States Patent
Smith et al.

(10) Patent No.: US 11,137,802 B2
(45) Date of Patent: Oct. 5, 2021

(54) ANTI-WARP BEZEL FOR FOLDABLE DEVICE

(71) Applicant: Lenovo (Singapore) Pte. Ltd., Singapore (SG)

(72) Inventors: Madison Kay Smith, Manhattan Beach, CA (US); Cuong Huy Truong, Cary, NC (US); Brian Hargrove Leonard, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/389,977

(22) Filed: Apr. 21, 2019

(65) Prior Publication Data

US 2020/0333848 A1 Oct. 22, 2020

(51) Int. Cl.
*G06F 1/16* (2006.01)
(52) U.S. Cl.
CPC .......... *G06F 1/1656* (2013.01); *G06F 1/1626* (2013.01); *G06F 1/1652* (2013.01)
(58) Field of Classification Search
CPC .............................. G06F 1/1652; G06F 1/1681
See application file for complete search history.

(56) References Cited

U.S. PATENT DOCUMENTS

| 6,421,235 | B2 * | 7/2002 | Ditzik | G06F 1/1616 |
| | | | | 320/114 |
| D788,734 | S * | 6/2017 | Park | D14/138 AB |
| 9,729,688 | B2 * | 8/2017 | Lee | H04M 1/0279 |
| 9,818,961 | B2 * | 11/2017 | Hiroki | H01L 51/0097 |
| 9,851,759 | B2 * | 12/2017 | Tazbaz | G06F 1/163 |
| 9,898,051 | B2 * | 2/2018 | Cho | G06F 1/1616 |
| D814,435 | S * | 4/2018 | Kwon | D14/138 AB |
| D814,455 | S * | 4/2018 | Kwon | D14/341 |
| 10,121,989 | B2 * | 11/2018 | Park | H01L 27/3244 |
| 10,164,208 | B2 * | 12/2018 | Lee | B32B 3/266 |
| 10,209,743 | B1 * | 2/2019 | Hsu | H05K 7/20954 |
| 10,368,452 | B2 * | 7/2019 | Yun | G06F 1/1681 |
| 10,516,119 | B2 * | 12/2019 | Lee | H01L 51/0097 |
| D875,091 | S * | 2/2020 | Kwon | D14/341 |
| 2002/0067339 | A1 * | 6/2002 | Min | G06F 1/1601 |
| | | | | 345/156 |
| 2008/0055831 | A1 * | 3/2008 | Satoh | H05K 1/0281 |
| | | | | 361/600 |

(Continued)

*Primary Examiner* — Adrian S Wilson
(74) *Attorney, Agent, or Firm* — Ference & Associates LLC

(57) ABSTRACT

One embodiment provides a method, including: a foldable information handling device comprising a flexible display, wherein the foldable information handling device bends along a centerline; and a bezel operatively coupled to the information handling device and surrounding the flexible display, the bezel comprising: a first edge comprising a first edge center portion corresponding to the centerline; and a second edge on an opposite side of the flexible display as the first edge and comprising a second edge center portion corresponding to the centerline; wherein each of the first center portion and the second center portion comprises a component allowing bending of the first edge and the second edge with a bending of the foldable information handing device along the centerline. Other aspects are described and claimed.

20 Claims, 3 Drawing Sheets

(56) References Cited

U.S. PATENT DOCUMENTS

| | | | | |
|---|---|---|---|---|
| 2012/0307423 A1* | 12/2012 | Bohn | .................... | G06F 1/1652 |
| | | | | 361/679.01 |
| 2013/0216740 A1* | 8/2013 | Russell-Clarke | ...... | B65D 85/00 |
| | | | | 428/33 |
| 2014/0217875 A1* | 8/2014 | Park | ...................... | G06F 1/1681 |
| | | | | 312/326 |
| 2014/0226275 A1* | 8/2014 | Ko | ........................ | G06F 1/1681 |
| | | | | 361/679.27 |
| 2014/0300529 A1* | 10/2014 | Kim | .................... | H01L 27/3216 |
| | | | | 345/80 |
| 2015/0055287 A1* | 2/2015 | Seo | ....................... | G06F 1/1641 |
| | | | | 361/679.27 |
| 2015/0370287 A1* | 12/2015 | Ko | ........................ | G06F 1/1681 |
| | | | | 361/749 |
| 2016/0081180 A1* | 3/2016 | Huitema | .................. | G09F 9/30 |
| | | | | 361/749 |
| 2016/0127525 A1* | 5/2016 | Lee | ....................... | G06F 1/1626 |
| | | | | 455/575.1 |
| 2017/0194580 A1* | 7/2017 | Lee | .................... | H01L 51/5256 |
| 2017/0357289 A1* | 12/2017 | Ahn | .................... | G06F 1/1652 |
| 2018/0373297 A1* | 12/2018 | Liao | .................... | G06F 1/1652 |
| 2019/0005857 A1* | 1/2019 | Wakata | .................... | G09F 9/30 |
| 2019/0141843 A1* | 5/2019 | Park | ...................... | H05K 1/189 |

* cited by examiner

US 11,137,802 B2

ANTI-WARP BEZEL FOR FOLDABLE DEVICE

BACKGROUND

Information handling devices (e.g., tablets, smart phones, eReaders, etc.) are increasing in functionality, allowing a user to perform more tasks than before on a singular device. Additionally, the portability of these devices is increasing, allowing users to carry the devices at all times. However, the increase in functionality may require a larger footprint for the information handling device, which may decrease the portability of the device. Accordingly, many of these devices are incorporating edge displays where the display goes all the way to the edge of the device and/or foldable displays that allow for folding the device into a smaller footprint for increased portability.

BRIEF SUMMARY

In summary, one aspect provides a method, comprising: a foldable information handling device comprising a flexible display, wherein the foldable information handling device bends along a centerline; and a bezel operatively coupled to the information handling device and surrounding the flexible display, the bezel comprising: a first edge comprising a first edge center portion corresponding to the centerline; and a second edge on an opposite side of the flexible display as the first edge and comprising a second edge center portion corresponding to the centerline; wherein each of the first center portion and the second center portion comprises a component allowing bending of the first edge and the second edge with a bending of the foldable information handing device along the centerline.

Another aspect provides an information handling device, comprising: a first edge comprising a first edge center portion corresponding to a foldable portion of the flexible bezel; and a second edge substantially opposite and parallel to the first edge and comprising a second edge center portion corresponding to the foldable portion of the flexible bezel; wherein each of the first center portion and the second center portion comprises a component allowing bending of the first edge and the second edge along the foldable portion.

A further aspect provides a product, comprising: a foldable information handling device comprising a flexible display, wherein the foldable information handling device bends along a centerline; and a bezel operatively coupled to the information handling device and surrounding the flexible display, the bezel comprising: a first edge comprising a first edge center portion corresponding to the centerline; and a second edge on an opposite side of the flexible display as the first edge and comprising a second edge center portion corresponding to the centerline; wherein each of the first center portion and the second center portion comprises a component allowing bending of the first edge and the second edge with a bending of the foldable information handing device along the centerline, wherein the component comprises an undulation material, wherein the undulation of material comprises a vertical undulation with respect to the display surface of the foldable information handling device and the surface opposite the display of the foldable device, wherein the undulation comprises a thinner material portion at the top of the material and a thicker material portion at the bottom of the material.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
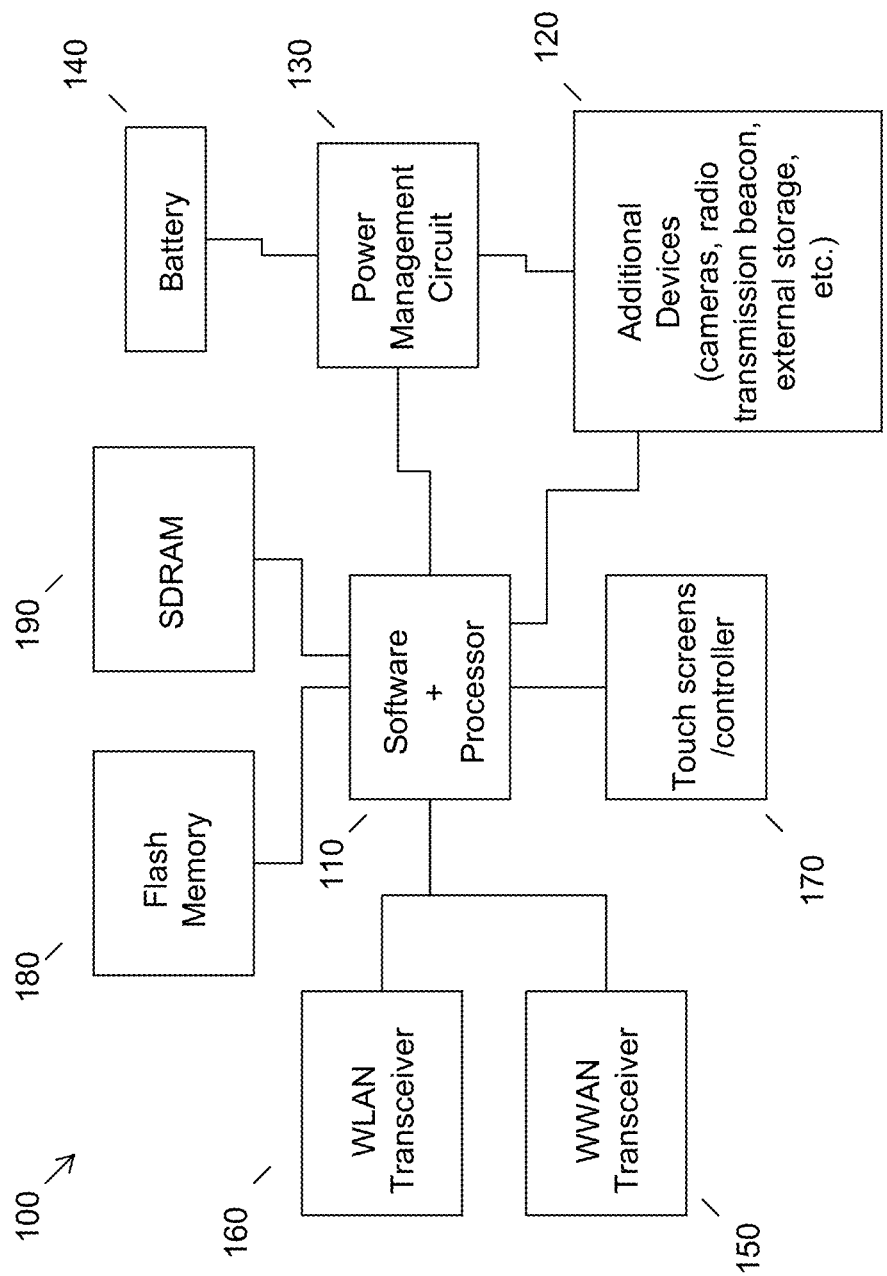
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Conventionally, information handling devices that allow folding of the device, for example, through the use of a flexible display and a hinge or other bendable portion of the information handling device include a bezel. The problem with this bezel is that it will bunch up or warp as the device transitions between an open and closed state. The material used in conventional methods may produce warping in a variety of locations on a device, for example, along the spine of a foldable information handling device, along the edges of the device, at the corners, and the like. Generally the bezel is made of a thin material that allows for some flexibility and allows for folding of the device. However, upon opening and closing of the device, the bezel, regardless of how thin the material is, will warp or bunch, because the radius of the material is shortening without a place for the extra material to go.

Accordingly, an embodiment provides a system which has a bezel made from a flexible material that is used to surround a display of a foldable information handling device. The flexible material that the bezel is made from may not warp, or get bunched up, as the foldable information handling device transitions between display modes. Therefore, an embodiment allows a foldable information handling device to transition between its display modes without warping. In one embodiment, the bezel may include a center component that is specifically designed to allow folding and unfolding of the device without warping the bezel.

In an embodiment, the bezel may comprise a flexible material (e.g., silicon) that may expand or compress without tearing. For example, a material such as a cloth may have the ability to stretch up to a certain amount of tension before ripping, herein referred to as an elastic value. The flexible material used in the bezel must be able to withstand transitioning between a completely opened position of the foldable device, when the bending radius of the foldable device is 180 degrees, to a completely closed position of the foldable device. In an embodiment, the amount of flexible material used along a specific portion of the bezel may vary. For example, the bezel edges other than the center component may include a thicker portion of material than the center portion where the foldable device bends or hinges. The amount of material and the geometry of the material used at specific locations on a bezel may assist a system in preventing the bezel from warping.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., an image sensor such as a camera, audio capture device such as a microphone, motion sensor such as an accelerometer or gyroscope, a thermal sensor, etc. System 100 often includes one or more touch screens 170 for data input and display/rendering. System 100 also typically includes various memory devices, for example flash memory 180 and SDRAM 190.

Figure 2:
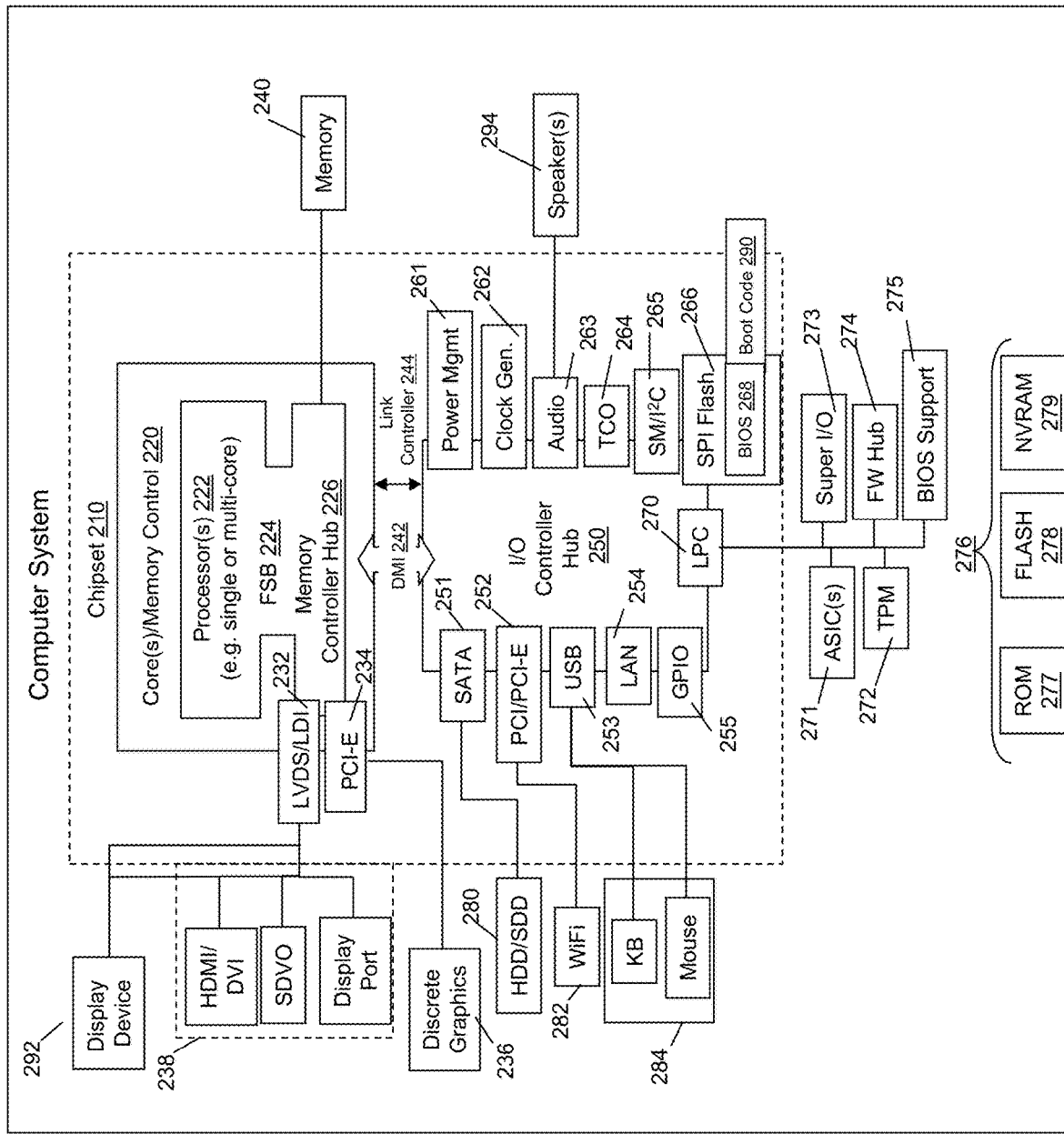
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD or YOGA series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices such as smart phones, tablets, laptops, televisions, personal computer devices generally, and/or electronic devices that may include a bezel, for example, a foldable device. For example, the circuitry outlined in FIG. 1 may be implemented in a tablet or smart phone embodiment, whereas the circuitry outlined in FIG. 2 may be implemented in a laptop.

Foldable information handling devices are devices that allow movement from a closed position to an open position without interfering with what a user is attempting to complete on the device at that time. For example, a user may use the device to talk another person while the device is closed, and, while the call is ongoing, the user may open the device with no interruption to the call. Additionally, a foldable information handling device may provide a single device that allows for a user to view or utilize multiple displays. Arguably most importantly, a foldable information handling device provides a device with lots of functionality, but still able to take up a small footprint when desired by the user.

Foldable information handling devices generally include flexible displays, so that the device can be folded, but when unfolded there is no transition line, bezel, or other divider between the screens. The flexible displays are made of a material that allows the display to be folded without causing damage to the display. However, these types of displays generally require a bezel that surrounds the display and assists in attaching the display to the information handling device. Transitioning between foldable configurations on a foldable device may produce a large amount of stress on a device, specifically along the centerline, or the spine, of a device. Thus, the bezel also assists in providing support and structure to the device. However, the bezel also is subjected to the same, or more, stress as the device itself when moved between folding configurations. Thus, in an embodiment, the bezel of the foldable information handling device is designed, in either or both material and geometry, to reduce the stress on the bezel by using a flexible material and/or geometry that resists bunching or warping.

A foldable information handling device may transition between an opened and closed state over a centerline or hinged portion of a device. In one embodiment the centerline may be located such that, when folded, two equal sized portions overlap onto one another. However, it should be understood that while the term centerline is used here throughout, this centerline does not have to be in the true center of the device. Rather, the centerline simply refers to the axis of folding of the information handling device. For example, in one embodiment, when the device is folded along the centerline, the overlapping sections may be different sizes. Additionally, a foldable information handling device may have multiple centerlines. For example, a user may be able to fold the device in both a portrait and a landscape folding configuration. Thus, in this example, the foldable device would have two centerlines.

Figure 3:
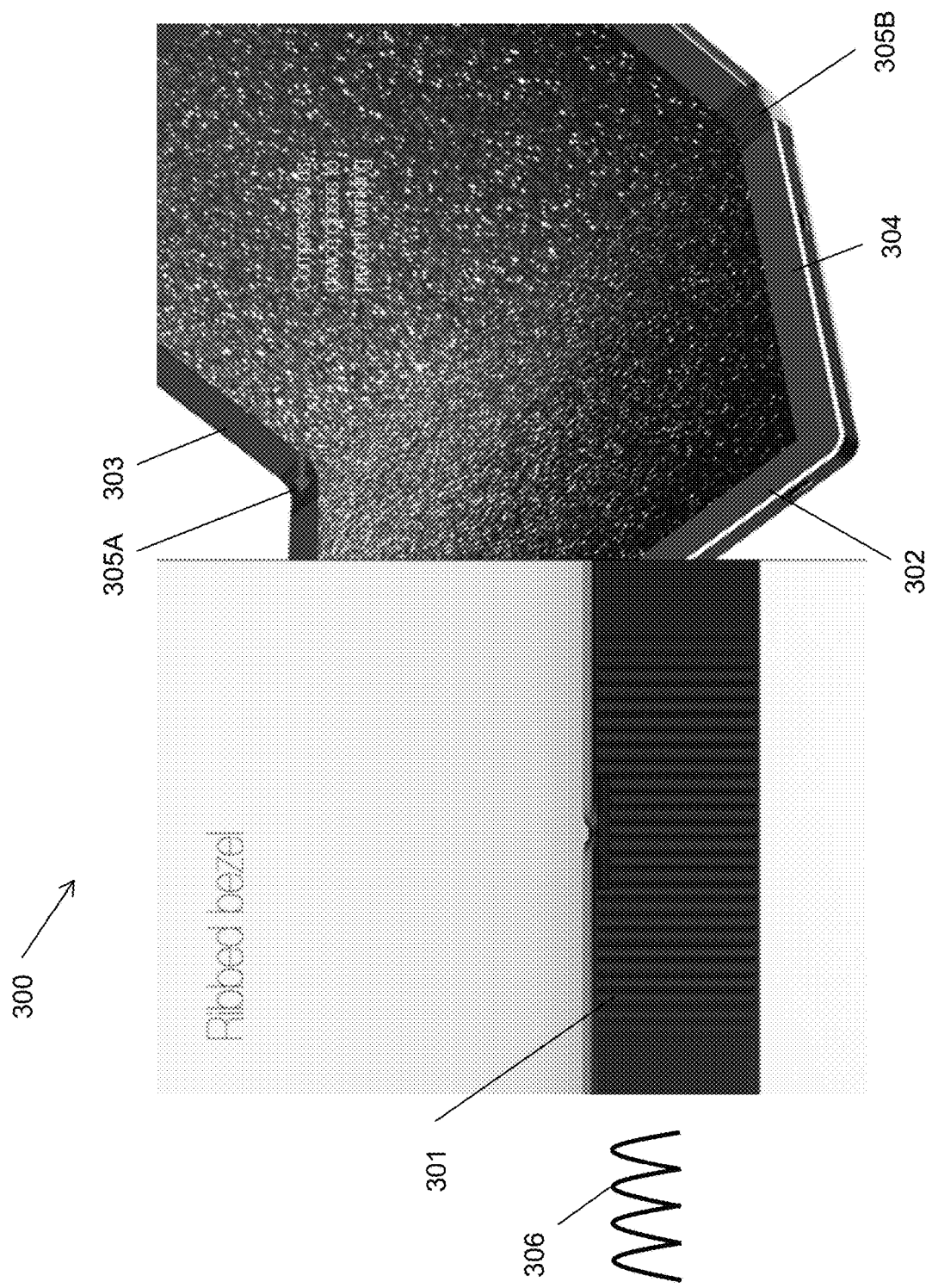
FIG. 3 illustrates an example of an undulation component used at the first edge center position and the second edge center position of a bezel.

A foldable information handling device comprises the ability to fold because the device may comprise a hinge, or material that permits such folding, for example, silicon, rubber, or the like, or a material geometry that permits folding, for example, undulations, notches, grooves, or the like, or a combination thereof. In an embodiment, a device may include a bezel surrounding the display of the information handling device, for example, a bezel around the exterior perimeter of a display surface of the information handling device. This bezel may also be made of a material or material geometry, for example, an undulation component, or the like, that may allow a bezel to move seamlessly with the folding actions associated with the information handling devices. For example, the bezel may include a material that permits folding (e.g., silicon, rubber, etc.) a material geometry that permits folding (e.g., undulations, notches, grooves, etc.), co-molding of two different materials where one material has an elasticity and allows compression or two different materials having different durometers, or hardnesses, the material having the lower durometer allowing for compression, or a combination thereof Referring now to FIG. 3, an example bezel which may be operatively coupled to a foldable information handling device 300 is shown. The bezel in this example includes four edges, a top edge 303, a bottom edge 304, a left edge 302, and a right edge (not shown, but opposite the left edge 305). While the example of FIG. 3 illustrates a rectangular device, and, therefore, a rectangular bezel, it should be understood that the geometry of either the device and/or the bezel may be of different shapes which may result in a different number of edges. For example, if the device was a hexagonal shape, the bezel would have six edges.

In one embodiment, each edge of the bezel may be made from the same material. This material may be a material that is flexible, for example, silicon, rubber, a thin plastic, or the like. However, the amount of material used at each location along the bezel may be different. For example, along the first edge of the bezel, the top edge 303 in the example of FIG. 3, and the second edge of a bezel, the bottom edge 304 in the example of FIG. 3, an amount of material used in the locations other than the center component 305A and 305B, respectively, may be greater than the amount of material used in the center component 305A and 305B. The terms first edge and second edge will be used here throughout to increase readability. However, these terms are not specific to a particular edge. Rather, the first edge and the second edge are the edges of the bezel that include the center component. In other words, the first edge and the second edge are the edges of the bezel that fold with the device. Thus, a device may have more than one first edge and more than one second edge. Additionally, the first edge and second edge are generally opposite each other on the device. Specifically, since the device folds along at least one centerline, the first edge and the second edge are the edges of the bezel that fold when the device is folded along that centerline, thereby, being substantially opposite edges of the bezel.

With respect to the center portion or component of the bezel, that corresponds to the centerline of the device, the amount of material used may be less than that of the rest of first and second edge. In other words, the material used in the center portion or component may be "thinner" than the material of the rest of the edge. For example, 301 provides a zoomed-in view of the material used along the center portion of a bezel. The material geometry may include a wave-like pattern, further referred to as grooves or undulations, to assist in preventing warping of the bezel as the foldable information handling device transitions between foldable states or configurations. In other words, the center component of the first edge may prevent warping of the first edge of the bezel and the center component of the second edge may prevent warping of the second edge of the bezel. The groove pattern, or undulation component, located at the center portion of the bezel may include less material because of the space between peaks of each groove.

Located at the center of both the first edge and the second edge of the bezel, the first edge center portion and the second edge center portion may consist of a undulation, rather than a solid strip of flexible material as is present everywhere else along the first edge and second edge of the bezel. Thus, the undulations of the center portion provide a system with the ability to bend without warping the bezel. The center portions of each edge are determined based on the centerline affiliated with the foldable information handling device. For example, similar to a book, a foldable information handling device may fold to close, or may unfold to 180 degrees to open. The spine of the book, or where the pages of the book fold over on another, may also be known as the centerline. Again, it should be understood that the centerline does not have to be in the exact center of the device. To determine a size or length of the center component, a user may identify the thickness of the foldable information handling device and adding the thickness of the bezel when a system is closed. By adding these two values together, a system may determine the minimal width required for the center portion of the first and second edge of the bezel.

An embodiment may utilize the groove pattern along the centerline of a bezel to combat bunching up or bubbling of the flexible material as the foldable information handling device transitions from open to close. For example, the undulations may run in a vertical orientation with respect to the display surface of the device and the bottom surface, substantially opposite the display surface, of the device. In other words, when looking at the undulations from above the display surface, a user would see the grooves in the material, as shown in FIG. 3. The undulation may include a thinner material (with respect to a width of the material from a cross-sectional perspective) portion at the top (corresponding to the display surface) of the undulation and a thicker material (with respect to a width of the material from a cross-sectional perspective) portion of the bottom (corresponding to the bottom surface) of the undulation. In other words, from a cross-section perspective, the undulation may appear to be peaks where the base of the peak is wider than the top of the peak, for example, as shown in FIG. 3 at 306. Thus, when the foldable information handling device folds shut, or closes, the grooves located in each center portion may compress, specifically by compressing the space located between the top of the peaks of the grooves. Additionally, the bottom of the peaks may slightly extend as the device is folded. In other words, as the information handling device in a system folds, the space between each groove peak may compress until the space between each groove peak dissipates. In the example of 306, the area under the peaks appears open or unfilled. However, this area may be filled with material. In other words, the space under the peaks may filled with material, which may provide a more sturdy and/or resilient design.

As another example, in the case that two different materials having different durometers, or hardnesses, or having different elasticities, one material may make up the peaks as shown in 306 and the other material, having the lower durometer or hardness, may fill in the gaps between the peaks. The material having the lower durometer can then compress when the foldable information handling device folds shut and expand when the device is opened. This combination of materials may provide a more aesthetically pleasing configuration, because when opened, the bezel would appear to be a single piece without grooves. However, it should be understood that this co-molding or combination of materials would still be undulations with the open portion of the undulation filled in by the "softer" or more elastic material.

The result of the compressed grooves may provide a way to overcome warping of the bezel by removing material that would be in excess when the device is in a folded position. For example, if the center portions of the bezel consisted of the same amount of material as rest of the bezel, when folding the information handling device the amount of material along the spine is greater than the amount of area that the material must compress into, thus, warping the bezel. Therefore, removing excess material, and implementing a groove design that includes thin, vertical flexible material strips may permit a system to compress and fold without warping.

In an embodiment, the foldable information handling device may move from a closed position to an open position with a bending radius of up to 180 degrees. When opening a system, the bezel and the information handling device, alike, extend materials that were once compressed to a state that provides much less stress on a material than when the material was compressed. For example, as a system extends from a closed position to an open position, the grooves located at each edge portion will extend and begin to separate, revealing the spaces between each groove, until the system is at 180 degrees, as seen in 301 and 306. In other words, when unfolding the device, the thinner material located at the peaks of the grooves will extend. When a system reaches the bending radius of 180 degrees, or completely open, the grooves located in each center portion will have a consistent spacing between each peak, and the stress on the material along the centerline of the foldable information handling device may be minimal.

In an embodiment, the material used in the bezel may have an elastic value great enough to withstand the foldable configurations of the foldable information handling device. The material used in the bezel may need to remain tight through an excessive amount of display adjustments. A shape must be maintained when the stress on the bezel is at its greatest, specifically, when the foldable information handling device is closed. Additionally, the shape must be maintained, specifically, maintaining a smooth, non-drooping shape when the bezel faces its least amount of stress, specifically, when the foldable information device is opened. For example, a material such as silicone may fulfill the desired elastic value to maintain the bezel shape throughout different stress levels. Silicone may also provide a system with a durable material that can withstand a large number of folding and unfolding cycles.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium such as a non-signal storage device that are executed by a processor. A storage device may be, for example, a system, apparatus, or device (e.g., an electronic, magnetic, optical, electromagnetic, infrared, or semiconductor system, apparatus, or device) or any suitable combination of the foregoing. More specific examples of a storage device/medium include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A system, comprising:
   a foldable information handling device comprising a foldable display, wherein the foldable information handling device bends along a centerline when transitioning between display modes; and
   a bezel operatively coupled to the information handling device and surrounding the foldable display, the bezel comprising:
   a first edge comprising a first edge center portion corresponding to the centerline; and
   a second edge on an opposite side of the foldable display as the first edge and comprising a second edge center portion corresponding to the centerline;
   wherein each of the first edge center portion and the second edge center portion comprises a component allowing bending of the first edge and the second edge with a bending of the foldable information handing device along the centerline;
   wherein the component comprises a plurality of undulations composed of a first material and wherein gaps between each peak of the plurality of undulations are filled with a second material;
   wherein the first material is a higher durometer elastomer than the second material and wherein the second material is configured to compress in response to a transition of the foldable information handling device to a closed state and is configured to expand in response to another transition of the foldable information handling device to an open state.

2. The system of claim 1, wherein the component comprises an undulation of material.

3. The system of claim 2, wherein the undulation of material comprises a vertical undulation with respect to a display surface of the foldable information handling device comprising the flexible display and a second surface of the foldable information handling device substantially opposite the display surface.

4. The system of claim 2, wherein the undulation comprises a thinner material portion at a top of the material, wherein the top corresponds to a surface of the foldable information handling device having the flexible display.

5. The system of claim 4, wherein the undulation comprises a thicker material portion at a bottom of the material, wherein the bottom corresponds to a surface of the foldable information handling device substantially opposite the flexible display surface.

6. The system of claim 5, wherein the thinner material portion compresses upon folding of the foldable information handling device.

7. The system of claim 5, wherein the thinner material portion extends upon unfolding of the foldable information handling device.

8. The system of claim 1, wherein the component has a bending radius of up to 180 degrees.

9. The system of claim 1, wherein the first edge center portion prevents warping of the first edge and the second edge center portion prevents warping of the second edge.

10. The system of claim 1, wherein the first edge and the second edge, other than the first edge center portion and the second edge center portion, comprise a more rigid material than the first edge center portion material and the second edge center portion material.

11. A flexible bezel, comprising:
    a first edge comprising a first edge center portion corresponding to a foldable portion of the flexible bezel; and
    a second edge substantially opposite and parallel to the first edge and comprising a second edge center portion corresponding to the foldable portion of the flexible bezel;
    wherein each of the first edge center portion and the second edge center portion comprises a component allowing bending of the first edge and the second edge along the foldable portion;
    wherein the component comprises a plurality of undulations composed of a first material and wherein gaps between each peak of the plurality of undulations are filled with a second material;

wherein the first material is a higher durometer elastomer than the second material and wherein the second material is configured to compress in response to a transition of the foldable information handling device to a closed state and is configured to expand in response to another transition of the foldable information handling device to an open state.

12. The flexible bezel of claim 11, wherein the component comprises an undulation of material.

13. The flexible bezel of claim 12, wherein the undulation of material comprises a vertical undulation with respect to top of the material used in the bezel and a second surface of the bottom of the material used in the bezel.

14. The flexible bezel of claim 12, wherein the undulation comprises a thinner material portion at a top of the material used in the bezel.

15. The flexible bezel of claim 14, wherein the undulation comprises a thicker material portion at a bottom of the material used in the bezel.

16. The flexible bezel of claim 14, wherein the thinner material portion compresses upon folding of the bezel.

17. The flexible bezel of claim 14, wherein the thinner material portion extends upon unfolding of the bezel.

18. The flexible bezel of claim 11, wherein the component has a bending radius of up to 180 degrees.

19. The flexible bezel of claim 11, wherein the first edge center portion prevents warping of the first edge and the second edge center portion prevents warping of the second edge.

20. A system, comprising:
a foldable information handling device comprising a foldable display, wherein the foldable information handling device bends along a centerline when the foldable information handling device transitions between display modes; and
a bezel operatively coupled to the information handling device and surrounding the foldable display, the bezel comprising:
a first edge comprising a first edge center portion corresponding to the centerline; and
a second edge on an opposite side of the foldable display as the first edge and comprising a second edge center portion corresponding to the centerline;
wherein each of the first center edge portion and the second center edge portion comprises a component allowing bending without warping of the first edge and the second edge with a bending of the foldable information handling device along the centerline;
wherein the component comprises a plurality of undulations composed of a first material and wherein gaps between each peak of the plurality of undulations are filled with a second material;
wherein the first material is a higher durometer elastomer than the second material and wherein the second material is configured to compress in response to a transition of the foldable information handling device to a closed state and is configured to expand in response to another transition of the foldable information handling device to an open state.

* * * * *